United States Patent
Moon (10) Patent No.: US 9,504,965 B2
(45) Date of Patent: Nov. 29, 2016

(54) FILTERING APPARATUS

(71) Applicant: KOLON INDUSTRIES, INC., Gwacheon-si, Gyeonggi-do (KR)

(72) Inventor: Heewan Moon, Seoul (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days.

(21) Appl. No.: 14/442,943

(22) PCT Filed: Dec. 27, 2013

(86) PCT No.: PCT/KR2013/012251
§ 371 (c)(1),
(2) Date: May 14, 2015

(87) PCT Pub. No.: WO2014/104779
PCT Pub. Date: Jul. 3, 2014

(65) Prior Publication Data
US 2015/0328587 A1    Nov. 19, 2015

(30) Foreign Application Priority Data

Dec. 28, 2012   (KR) .......................... 10-2012-0155994

(51) Int. Cl.
*B01D 65/02*   (2006.01)
*B01D 65/08*   (2006.01)
(Continued)

(52) U.S. Cl.
CPC ............... *B01D 65/02* (2013.01); *B01D 63/02* (2013.01); *B01D 63/04* (2013.01); *B01D 63/043* (2013.01);
(Continued)

(58) Field of Classification Search
CPC ...... B01D 61/18; B01D 61/20; B01D 63/02; B01D 63/04; B01D 63/043; B01D 63/046; B01D 65/02; B01D 65/08; B01D 2313/06; B01D 2313/21; B01D 2313/56; B01D 2315/06; B01D 2319/04; B01D 2321/185; C02F 1/444; C02F 2201/002; C02F 2201/004
See application file for complete search history.

(56) References Cited

U.S. PATENT DOCUMENTS 5,194,149 A *   3/1993   Selbie .................. B01D 35/303
                                                           210/232
5,273,563 A *   12/1993  Pasch ................. B01D 46/0005
                                                           55/493
(Continued)

FOREIGN PATENT DOCUMENTS

CN   101820981 A   9/2010
CN   102333581 A   1/2012
(Continued)

OTHER PUBLICATIONS

International Searching Authority, International Search Report of PCT/KR2013/012251 dated Jan. 28, 2014.
(Continued)

*Primary Examiner* — Katherine Zalasky
*Assistant Examiner* — Benjamin Lebron
(74) *Attorney, Agent, or Firm* — Sughrue Mion, PLLC (57) ABSTRACT

Disclosed is a filtering apparatus capable of minimizing the relative vibration of the filtering membrane module within the frame structure during the aeration cleaning process, thereby preventing the damage of the filtering membrane module which might be caused due to the relative vibration as well as the separation of the filtering membrane module from the frame structure. The filtering apparatus comprises a frame structure including a cross bar and a filtering membrane module installed in the frame structure. The cross bar comprises a first rib inserted into a receiver of the header of the filtering membrane module. The filtering apparatus further comprises a stopper fastened to an end of the first rib passing through a through-hole of the receiver so as to prevent the filtering membrane module from being separated from the frame structure.

5 Claims, 3 Drawing Sheets

(51) Int. Cl.
   *B01D 63/02*   (2006.01)
   *B01D 63/04*   (2006.01)
   *B01D 61/18*   (2006.01)
   *B01D 61/20*   (2006.01)
   *C02F 1/44*   (2006.01)

(52) U.S. Cl.
   CPC ............... *B01D 65/08* (2013.01); *B01D 61/18* (2013.01); *B01D 61/20* (2013.01); *B01D 2313/06* (2013.01); *B01D 2313/21* (2013.01); *B01D 2313/56* (2013.01); *B01D 2315/06* (2013.01); *B01D 2319/04* (2013.01); *B01D 2321/185* (2013.01); *C02F 1/444* (2013.01); *C02F 2201/002* (2013.01); *C02F 2201/004* (2013.01)

(56) References Cited

U.S. PATENT DOCUMENTS

| | | | | |
|---|---|---|---|---|
| 5,944,997 | A * | 8/1999 | Pedersen | B01D 61/18 210/195.2 |
| 6,899,811 | B2 * | 5/2005 | Cote | B01D 63/02 210/257.2 |
| 2001/0027951 | A1 * | 10/2001 | Gungerich | B01D 61/18 210/636 |
| 2010/0000935 | A1 * | 1/2010 | Sakai | B01D 63/082 210/455 |
| 2010/0200481 | A1 * | 8/2010 | Nakahara | B01D 61/18 210/151 |
| 2010/0258492 | A1 * | 10/2010 | Kang | B01D 63/02 210/232 |
| 2010/0270227 | A1 | 10/2010 | Kang et al. | |
| 2012/0012514 | A1 | 1/2012 | Sasakawa et al. | |
| 2012/0074056 | A1 | 3/2012 | Lee et al. | |

FOREIGN PATENT DOCUMENTS

| | | |
|---|---|---|
| JP | 2008264619 A | 11/2008 |
| JP | 2010162523 A | 7/2010 |
| KR | 10-0722332 B1 | 5/2007 |
| KR | 10-2008-0110862 A | 12/2008 |
| KR | 10-2009-0043638 A | 5/2009 |
| KR | 10-2012-0078149 A | 7/2012 |
| KR | 10-1192985 B1 | 10/2012 |
| WO | 2012033080 A1 | 3/2012 |
| WO | 2012125003 A2 | 9/2012 |

OTHER PUBLICATIONS

Japanese Patent Office; Communication dated Aug. 9, 2016 in counterpart application No. 2015-546401.

* cited by examiner

FILTERING APPARATUS

CROSS REFERENCE TO RELATED APPLICATIONS

This is a National Stage of International Application No. PCT/KR2013/012251 filed Dec. 27, 2013, claiming priority based on Korean Patent Application No. 10-2012-0155994 filed Dec. 28, 2012, the contents of all of which are incorporated herein by reference in their entirety.

TECHNICAL FIELD

The present invention relates to a filtering apparatus comprising a frame structure and a filtering membrane module installed therein, and more particularly, to a filtering apparatus capable of minimizing the relative vibration of the filtering membrane module within the frame structure during the aeration cleaning process, thereby preventing the damage of the filtering membrane module which might be caused due to the relative vibration as well as the separation of the filtering membrane module from the frame structure.

BACKGROUND ART

Separation methods for water treatment include a method using a filtering membrane, a method using heat or phase-change, and so on.

A separation method using a filtering membrane has a lot of advantages over the method using heat or phase-change. Among the advantages is the high reliability of water treatment since the water of desired purity can be easily and stably obtained by adjusting the size of the pores of the filtering membrane. Furthermore, since the separation method using a filtering membrane does not require a heating process, the method can be used together with microorganisms which are useful for separation process but might be adversely affected by heat.

Among the separation methods using a filtering membrane is a method using a hollow fiber membrane. Typically, a hollow fiber membrane has been widely used in the field of microfiltration and/or ultrafiltration for obtaining axenic water, drinking water, super pure water, and so on. Recently, the application of the hollow fiber membrane is extended to wastewater treatment, solid-liquid separation in a septic tank, removal of suspended solid (SS) from industrial wastewater, filtration of river, filtration of industrial water, filtration of swimming pool water, and the like.

As the water treatment process is performed by the filtering membrane module, the impurities existing in the feed water causes the fouling problem, i.e., the contamination of the filtration membrane, which reduces the filtration efficiency of the filtering membrane. Since the contaminants of various forms causes the membrane contamination in various ways, it is required to clean the contaminated filtering membrane in various manners. The cleaning of the contaminated filtering membrane may be classified into a maintenance cleaning and a recovery cleaning in accordance with the purpose of the cleaning.

The recovery cleaning is a cleaning performed for relatively long time when serious deterioration in membrane permeation performance is caused to the filtering membrane module due to the contaminants accumulated as the water treatment is performed for a long time. The main purpose of the recovery cleaning is to recover the permeation performance of the filtering membrane.

On the other hand, the maintenance cleaning is a cleaning performed during the filtering process or while the filtering process is stopped for relatively short time. The main purpose of the maintenance cleaning is to maintain the permeation performance of the filtering membrane in a good state. The maintenance cleaning is mainly performed through a physical cleaning. The physical cleaning may be classified into a backwashing cleaning and an aeration cleaning.

The backwashing cleaning is a cleaning performed by causing the air or water to flow backward through the filtering membrane during a temporary stoppage of the water treatment, thereby removing the impurities adhered to the surface of the membrane. On the other hand, according to the aeration cleaning, the air is jetted from the aeration tubes to create the bubbles moving upwardly within the feed water (contained in the water treatment tank or housing). The impurities adhered to the surface of the filtering membrane are removed not only by the rising bubbles themselves but also by the ascending flow or circulation of the feed water which is created by the rising bubbles.

A submerged-type filtering apparatus which performs the filtration process while submerged in the feed water to be treated typically comprises a frame structure and a filtering membrane module installed therein. Since the air is strongly jetted from the aeration tubes during the aeration cleaning, if the filtering membrane module is coupled to the frame structure loosely, the filtering membrane module suffers severe relative vibration within the frame structure.

As a result of that, the filtering membrane module gets damaged while colliding with the frame structure, which causes serious problems in that the replacement cycle of the filtering membrane module is shortened and the cost for the replacement increases.

What is more serious is that, if the relative vibration of the filtering membrane module within the frame structure continues to cause their connection to be more loose or cause the filtering membrane module itself to be damaged, the filtering membrane module will be separated from the frame structure and the non-treated feed water will be introduced to the permeate storage tank.

A submerged-type filtering apparatus is disclosed in Korean Laid-Open Patent Publication No. 10-2009-0043638 (hereinafter, 'prior art') published on May 7, 2009.

The filtering apparatus of the prior art comprises a frame structure having overall shape of cuboid and hollow fiber membrane modules installed therein. The frame structure comprises four vertical members and four cross bars supported by the vertical members respectively, and the hollow fiber membrane module comprises two headers and hollow fiber membranes therebetween.

According to the prior art, a coupling ring is formed on the header of the hollow fiber membrane module, and an elastic coupling member is combined to the front cross bar of the frame structure. The elastic coupling member comprises a pair of elastic wings and protrusions formed on the outer sides of the elastic wings.

When the hollow fiber membrane module is installed in the frame structure, the pair of elastic wings pass through the hole of the coupling ring of the header. When the protrusions respectively formed on the outer sides of the elastic wings are passing through the hole of the coupling ring, the pair of elastic wings get bent in such a manner that they become closer to each other. Then, the elastic force makes the pair of elastic wings come back to the original position right after the protrusions of the elastic coupling member pass through the hole of the coupling ring. Once the installation of the hollow fiber membrane module in the frame structure is completed, the protrusions prevent the elastic coupling member from getting out of the hole of the coupling ring.

However, according to the aforementioned structure, the pair of coupling wings to be inserted into the coupling ring of the header must have elasticity, and thus the relative vibration of the hollow fiber membrane module within the frame structure cannot be inhibited completely. Furthermore, since the coupling state of the frame structure and hollow fiber membrane module depends only on the small protrusions, there is a high risk that the protrusions are damaged due to the relative vibration of the hollow fiber membrane module, thereby causing the hollow fiber membrane module to be separated from the frame structure.

DISCLOSURE

Technical Problem

Therefore, the present invention is directed to a filtering apparatus capable of preventing these limitations and drawbacks of the prior art.

An aspect of the present invention is to provide a filtering apparatus capable of minimizing the relative vibration of the filtering membrane module within the frame structure during the aeration cleaning process, thereby preventing both the damage of the filtering membrane module which might be caused due to the relative vibration and the separation of the filtering membrane module from the frame structure.

Additional aspects and features of the present invention will be set forth in part in the description which follows and in part will become apparent to those having ordinary skill in the art upon examination of the following or may be learned from practice of the invention.

Technical Solution

In accordance with the aspect of the present invention, there is provided a filtering apparatus comprising: a frame structure; and a filtering membrane module installed in the frame structure, wherein the frame structure comprises a cross bar, the filtering membrane module comprises: a header having a collecting space; and a filtering membrane which is in fluid communication with the collecting space of the header, the filtering membrane module is inserted in the frame structure in such a manner that a longitudinal direction of the header is perpendicular to a longitudinal direction of the cross bar, the cross bar comprises a first rib protruding in parallel with the longitudinal direction of the header, the header comprises a receiver having a through-hole into which the first rib is inserted, and the filtering apparatus further comprises a stopper fastened to an end of the first rib passing through the through-hole so as to prevent the filtering membrane module from being separated from the frame structure.

The stopper may comprise a second rib inserted into the through-hole of the receiver.

A first hole may be formed on the end of the first rib passing through the through-hole, the stopper may have a second hole corresponding to the first hole, and the first rib and the stopper may be fastened together with a bolt and a nut, the bolt passing through the first and second holes and screwing into the nut.

The cross bar may comprise a plurality of first ribs, the filtering apparatus may comprise a plurality of filtering membrane modules, each of the filtering membrane modules may comprise the receiver, each of the first ribs may be inserted into the through-hole of the each receiver respectively, and the stopper may be fastened to at least two of the first ribs.

The stopper may comprise a plurality of second ribs, and each of the second ribs may be inserted into the through-hole of the each receiver respectively.

The cross bar may further comprise a first protrusion between the first ribs, and the stopper may further comprise a second protrusion between the second ribs.

It is to be understood that both the foregoing general description and the following detailed description of the present invention are exemplary and explanatory and are intended to provide further explanation of the invention as claimed.

Advantageous Effect

According to the present invention, the relative vibration of the filtering membrane module within the frame structure during the aeration cleaning process can be minimized. Accordingly, both the damage of the filtering membrane module which might be caused due to the relative vibration and the separation of the filtering membrane module from the frame structure can be prevented.

Other advantages of the present invention will be described below in detail together with the related technical features.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR INVENTION

The filtering apparatus of the invention comprises a frame structure and a filtering membrane module installed therein. The filtering membrane module comprises a header having a collecting space and a filtering membrane which is in fluid communication with the collecting space. Although the filtering membrane may be a hollow fiber membrane or a plain membrane, the present invention is not limited thereto.

Just for the convenience of the explanation, referring to the annexed drawings, a filtering apparatus comprising a hollow fiber membrane module whose filtering membrane is a hollow fiber membrane will be held up as an example to describe the filtering apparatus of the present invention in detail.

Figure 1:
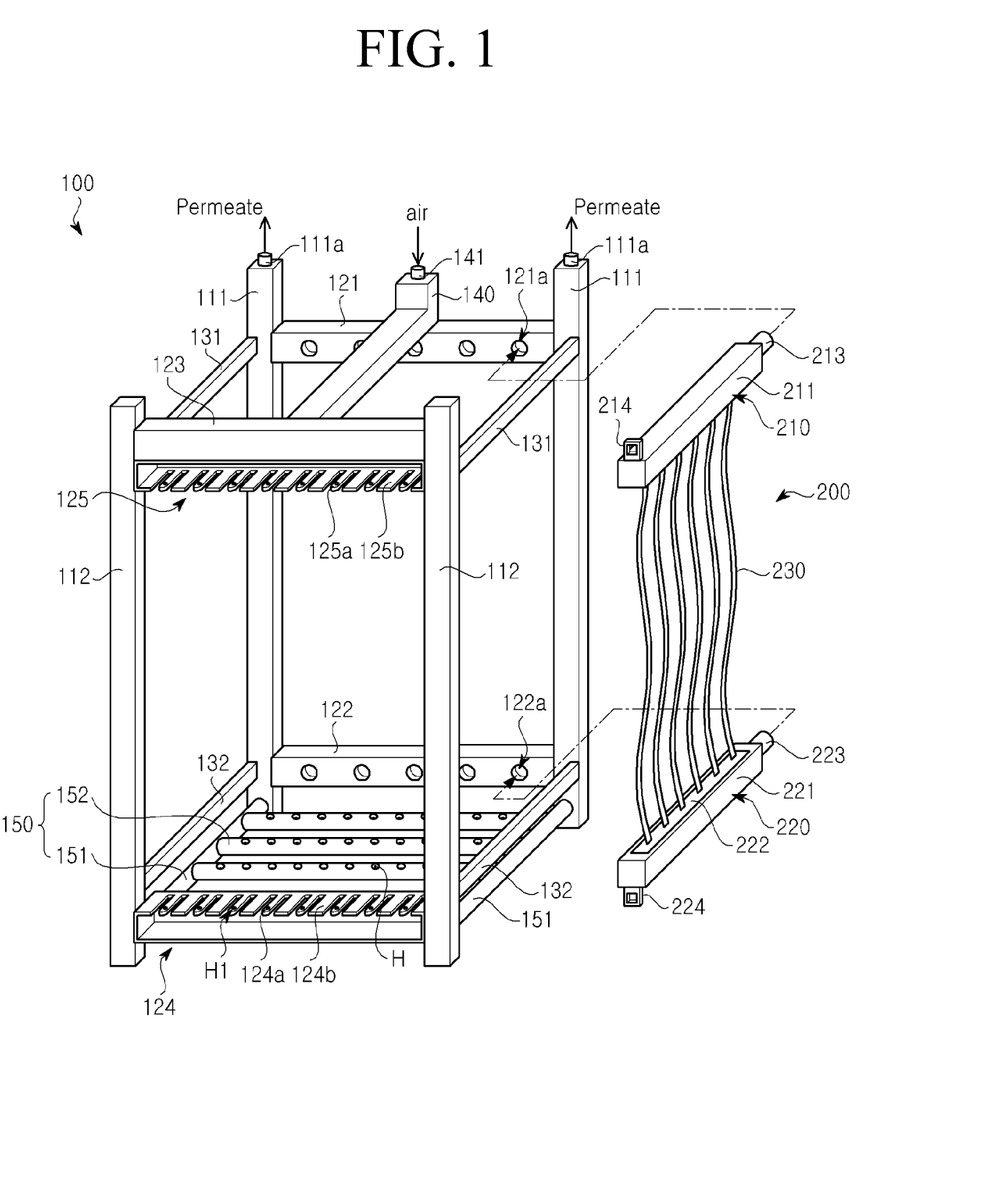
FIG. 1 is a perspective view schematically showing the filtering apparatus according to one embodiment of the present invention.

FIG. 1 is a perspective view schematically showing the filtering apparatus according to one embodiment of the present invention.

As illustrated in FIG. 1, the filtering apparatus of the present invention comprises a frame structure 100 and hollow fiber membrane module 200. The hollow fiber membrane module 200 is installed in the frame structure 100.

The hollow fiber membrane module 200 comprises a first header 210 of elongated shape having a first collecting space, a second header 220 of elongated shape having a second collecting space, and hollow fiber membranes 230 between the first and second headers 210, 220. The hollow fiber membranes 230 are in fluid communication with the first and second collecting spaces respectively.

The polymer resin that can be used for manufacturing the hollow fiber membrane 230 comprises at least one of polysulfone resin, polyethersulfone resin, sulfonated polysulfone resin, polyvinylidene fluoride (PVDF) resin, polyacrylonitrile (PAN) resin, polyimide resin, polyamideimide resin, and polyesterimide resin.

The hollow fiber membrane 230 may be a single-layer membrane or a composite membrane. If the hollow fiber membrane 230 is a composite membrane, it may comprise a tubular braid and a polymer thin film coated thereon. The tubular braid may be made of polyester or nylon. The polymer thin film comprises at least one of polysulfone resin, polyethersulfone resin, sulfonated polysulfone resin, polyvinylidene fluoride resin, polyacrylonitrile resin, polyimide resin, polyamideimide resin, and polyesterimide resin.

One end of the hollow fiber membrane 230 is fixed to the body 211 of the first header 210 through the first fixing layer (not shown), and the other end thereof is fixed to the body 221 of the second header 220 through the second fixing layer 222.

The lumen of the hollow fiber membrane 230 is in fluid communication with the first and second collecting spaces of the first and second headers 210, 220. Thus, when negative pressure is supplied to the lumen of the hollow fiber membrane 230, the permeate passes through the hollow fiber membrane 230, enters the first and second collecting spaces of the first and second headers 210, 220 via the lumen, and then comes out of them through the first and second outlet ports 213, 223.

Alternatively, only one of the first and second headers 210, 220 may have the collecting space.

Further, the hollow fiber membrane module 200 may comprise nothing but the first header 210 having the first collecting space and the hollow fiber membrane 230. In this case, one end of the hollow fiber membrane 230 is in fluid communication with the first collecting space and the other end thereof is sealed.

As illustrated in FIG. 1, the frame structure 100 according to the one embodiment of the present invention comprises four vertical members 111, 112 and three cross members 121, 122, 123.

The vertical members 111, 112 comprise two front vertical members 112 and two rear vertical members 111, and each of them has longitudinal direction parallel with the hollow fiber membrane 230 of the hollow fiber membrane module 200 installed in the frame structure 100.

The cross members 121, 122, 123 comprise front cross member 123 and two rear cross members 121, 122. The front cross member 123 is directly combined to the two front vertical members 112 to be supported by them, and each of the rear cross members 121, 122 is directly combined to the two rear vertical members 111 to be supported by them. The cross members 121, 122, 123 have longitudinal direction perpendicular to both the hollow fiber membrane 230 and the first and second headers 210, 220 of the hollow fiber membrane module 200.

The rear cross members 121, 122 comprise a rear upper cross member 121 corresponding to the first header 210 of the hollow fiber membrane module 200 and a rear lower cross member 122 corresponding to the second header 220.

According to one embodiment of the invention, as illustrated in FIG. 1, the rear upper cross member 121 is a pipe which is in fluid communication with the first collecting space of the first header 210 of the hollow fiber membrane 200. More particularly speaking, the first outlet port 213 of the first header 210 is inserted into the coupling hole 121*a* of the rear upper cross member 121 so that the first header 210 can be supported by the rear upper cross member 121 and, at the same time, the first collecting space of the first header 210 can be in fluid communication with the rear upper cross member 121. Similarly, the rear lower cross member 122 is also a pipe providing a fluid path, and the second outlet port 223 of the second header 220 is inserted into the coupling hole 122*a* of the rear lower cross member 122 so that the second header 220 can be supported by the rear lower cross member 122 and, at the same time, the second collecting space of the second header 220 can be in fluid communication with the rear lower cross member 122.

According to one embodiment of the invention, the two rear vertical members 111 are pipes each of which is in fluid communication with both the rear upper cross member 121 and rear lower cross member 122. Thus, the permeate passing through the hollow fiber membrane 230 as the negative pressure is supplied to the lumen of the hollow fiber membrane 230 is introduced in the first and second collecting spaces of the first and second headers 210, 220, forwarded to the rear upper cross member 121 and rear lower cross member 122 through the first and second outlet ports 213, 223, and then discharged to the outside through the outlet ports 111*a* of the rear vertical members 111.

According to another embodiment of the invention, one of the two rear vertical members 111 (hereinafter, 'first rear vertical member') is a pipe which is in fluid communication with the rear upper cross member 121, and the other of the two rear vertical members 111 (hereinafter, 'second rear vertical member') is a pipe which is in fluid communication with the rear lower cross member 122. Thus, the permeate introduced in the first collecting space of the first header 210 of the hollow fiber membrane module 200 passes through the rear upper cross member 121 and the first rear vertical member sequentially, and then comes out of the filtering apparatus. On the other hand, the permeate introduced in the second collecting space of the second header 220 of the hollow fiber membrane module 200 passes through the rear lower cross member 122 and the second rear vertical member sequentially, and then comes out of the filtering apparatus.

According to further embodiment of the invention, one of the two rear cross members 121, 122 is not a pipe providing a fluid path but merely functions as a means for supporting one of the first and second headers 210, 220 of the hollow fiber membrane module 200 which is corresponding thereto. In this case, the header corresponding to the rear cross member which performs only supporting function may have no collecting space therein, and both (or only one) of the two rear vertical members 111 may be pipes which are combined to and in fluid communication with the rear cross member which provides a path for the permeate.

The frame structure 100 of the invention may further comprise the horizontal members 131, 132 having longitudinal direction parallel with the first and second headers 210, 220 of the hollow fiber membrane module 200. According to one embodiment of the invention, the horizontal members 131, 132 comprise upper horizontal members 131 and lower horizontal members 132 disposed thereunder. Each of the horizontal members 131, 132 has both ends which are directly combined to one of the front vertical members 121 and one of the rear vertical members 111 respectively so that the distance between the front vertical members 112 and rear vertical members 111 can be kept constantly.

The frame structure 100 of the invention may further comprise an aeration unit 150 disposed under the hollow fiber membrane module 200. At least one of the front vertical members 112 is a pipe which is in fluid communication with the aeration unit 150 to provide a path for the air to be supplied to the aeration unit 150. The front cross member 123 is a pipe which is in fluid communication with the front vertical member(s) 112 which provide(s) the path for the air to be supplied to the aeration unit 150.

According to one embodiment of the invention, all the front vertical members 112 are pipes which are in fluid communication with the aeration unit 150 to provide the paths for the air to be supplied to the aeration unit 150, and the front cross member 123 is a pipe which is in indirect fluid communication with the aeration unit 150 through the two front vertical members 112. In this case, the air for cleaning the hollow fiber membrane 230 is provided for the aeration unit 150 after passing through the front cross member 123 and front vertical members 112 sequentially.

Optionally, as illustrated in FIG. 1, to supply the air to the front cross member 123, the frame structure 100 of the invention may further comprise an air pipe 140 which is in fluid communication with the front cross member 123. In this case, the air introduced in the air pipe 140 through the inlet port 141 is supplied to the aeration unit 150 after passing through the front cross member 123 and front vertical members 112 sequentially.

The aeration unit 150 may comprise an intermediate pipe 151 which is in fluid communication with at least one of the front vertical members 112 and a plurality of aeration tubes 152. The intermediate pipe 151 receives the air from the front vertical pipes 112 with which it is in fluid communication, and distributes the air to the plurality of aeration tubes 152. The air introduced in the aeration tubes 152 is jetted toward the feed water through the aeration holes H formed on the aeration tubes 152, and then removes the contaminants adhered to the surface of the hollow fiber membrane 230 while moving upwardly.

According to one embodiment of the invention, the aeration unit 150 comprises two intermediate pipes 151, and both ends of the each intermediate pipe 151 are directly combined to one of the front vertical members 112 and one of the rear vertical members 111 respectively so that the distance therebetween can be kept constantly. In this case, the lower horizontal members 132 which performs the same function may be omitted.

As illustrated in FIG. 1, the frame structure 100 of the present invention comprises at least one cross bar 124, 125. The hollow fiber membrane module 200 is installed in the frame structure 100 in such a manner that both the longitudinal direction of the headers 210 and 220 and the longitudinal direction of the hollow fiber membrane 230 are perpendicular to the longitudinal direction of the cross bar 124, 125.

If the hollow fiber membrane module 200 comprises nothing but the first header 210 having the first collecting space and the hollow fiber membrane 230, one end of the hollow fiber membrane 230 is in fluid communication with the first collecting space, the other end thereof is sealed, and the frame structure may include only one cross bar 125.

On the other hand, if the hollow fiber membrane module 200 comprises two headers 210, 220 and the hollow fiber membrane 230 therebetween, as shown in FIG. 1, the frame structure 100 comprises two cross bars, i.e., an upper cross bar 125 and a lower cross bar 124.

The upper cross bar 125 is combined to the lower portion of the front cross member 123. Optionally, the upper cross bar 125 may also be combined directly to the front vertical members 112. The portion of the first header 210 of the hollow fiber membrane module 200 which is opposite to the first outlet port 213 is coupled to the upper cross bar 125.

The lower cross bar 124 is combined directly to the two front vertical members 112. The portion of the second header 220 of the hollow fiber membrane module 200 which is opposite to the second outlet port 223 is coupled to the lower cross bar 124.

According to one embodiment of the invention, when the hollow fiber membrane module 200 is installed in the frame structure 100, the first and second outlet ports 213, 223 of the first and second headers 210, 220 are inserted into the coupling holes 121a, 122a of the rear upper cross member 121 and rear lower cross member 122 respectively, and the portions of the first and second headers 210, 220 which are opposite to the first and second outlet ports 213, 223 are coupled to the upper cross bar 125 and lower cross bar 124 respectively.

Hereinafter, referring to FIG. 2 and FIG. 3, the way how the second header 220 of the filtering membrane module 200 is coupled to the lower cross bar 124 of the frame structure 100 according to one embodiment of the invention will be described in detail.

Figure 2:
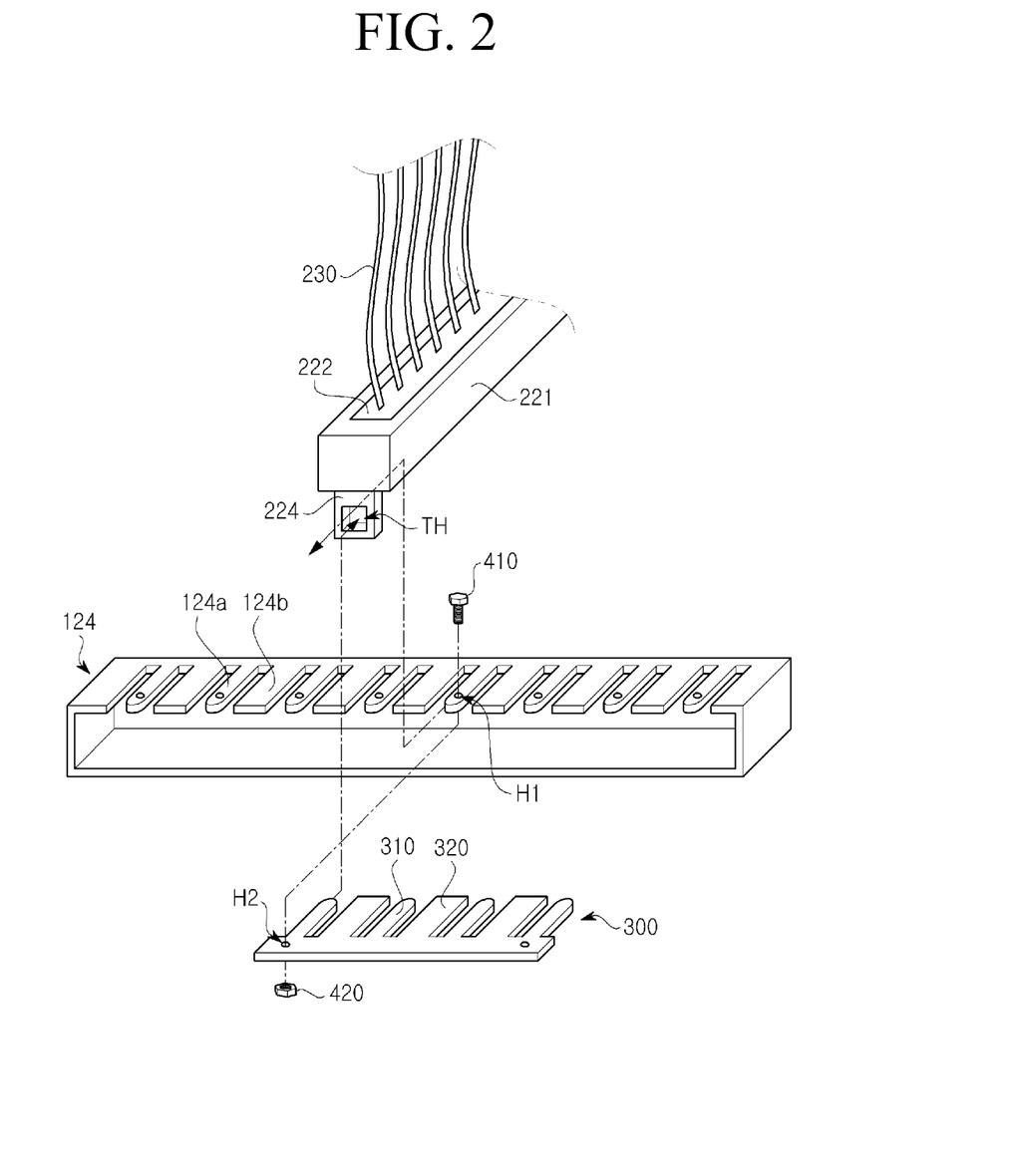
FIG. 2 shows the way how the filtering membrane module is coupled to the cross bar of the frame structure according to one embodiment of the present invention.

As illustrated in FIG. 2, the lower cross bar 124 of the invention comprises a first rib 124a protruding in parallel with the longitudinal direction of the second header 220, and the second header 220 comprises a receiver 224 formed at the portion opposite to the second outlet port 223 and on the side opposite to the second fixing layer 222.

The receiver 224 of the second header 220 has a through-hole TH. When the hollow fiber membrane module 200 is installed in the frame structure 100, the first rib 124a of the lower cross bar 124 is inserted into the through-hole TH of the receiver 224.

The filtering apparatus of the present invention further comprises a stopper 300. The stopper 300 is fastened to an end of the first rib 124a passing through the through-hole TH of the receiver 224 so as to prevent the filtering membrane module 200 (more particularly, the second header 220) from being separated from the frame structure 100 (more particularly, the lower cross bar 124).

According to one embodiment of the present invention, as illustrated in FIG. 2, a first hole H1 is formed on the end of the first rib 124a passing through the through-hole TH of the receiver 224 of the second header 220, and the stopper 300 has a second hole H2 corresponding to the first hole H1. The stopper 300 and the first rib 124a of the lower cross bar 124 are fastened together with a bolt 410 and a nut 420, the bolt 410 passing through the first and second holes H1, H2 and screwing into the nut 420.

The stopper 300 may further comprise a second rib 310 inserted into the through-hole TH of the receiver 224 of the second header 220.

The size of the through-hole TH of the receiver 224 of the second header 200 is large enough for the first rib 124a of the lower cross bar 124 to be easily inserted into, and, subsequent to the first rib 124a, the second rib 310 of the stopper 300 is inserted into the through-hole TH of the receiver 224 so that the first rib 124a of the lower cross bar 124 can be maintained tightly in the through-hole TH of the receiver 224 of the second header 220. Consequently, the relative vibration of the hollow fiber membrane module 200 within the frame structure 100 can be minimized.

Furthermore, since not only the first rib 124a but also the second rib 310 is inserted into the through-hole TH of the receiver 224, the power applied to the receiver 224 of the second header 220 of the hollow fiber membrane module 200 during the aeration cleaning process can be dispersed into the first and second ribs 124a, 310.

Consequently, according to the present invention, the durability of the filtering apparatus can be improved, and both the damage of the hollow fiber membrane module 200 and the separation of the hollow fiber membrane module 200 from the frame structure 100 can be prevented.

Optionally, the receiver 224 of the second header 220 may comprise an elastic member (not shown) capable of pressurizing the second rib 310 of the stopper 300 toward the first rib 124a of the lower cross bar 124 while the first and second ribs 124a, 310 are inserted in the receiver 224, thereby maintaining the first rib 124a of the lower cross bar 124 in the through-hole TH of the receiver 224 of the second header 220 further more tightly.

The filtering apparatus according to one embodiment of the invention comprises a plurality of hollow fiber membrane modules 200 installed in the frame structure 100. Thus, as illustrated in FIG. 2 and FIG. 3, the lower cross bar 124 of the frame structure 100 comprises a plurality of the first ribs 124a.

The second header 220 of each hollow fiber membrane module 200 comprises the receiver 224, and each of the first ribs 124a is inserted into the through-hole TH of each receiver 224 respectively.

Figure 3:
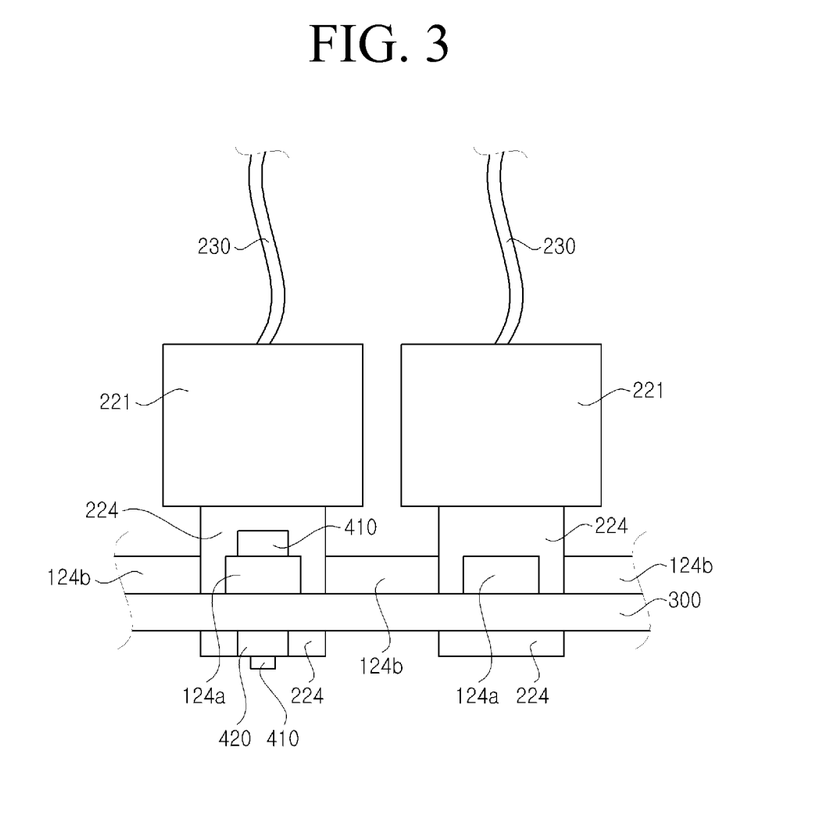
FIG. 3 is a front view schematically showing the header of the filtering membrane module and the cross bar of the frame structure coupled to each other.

As illustrated in FIG. 2 and FIG. 3, the lower cross bar 124 according to one embodiment of the present invention may further comprise a first protrusion(s) 124b between the first ribs 124a. Owing to the first protrusion(s) 124b, the power applied to the receiver 224 of the second header 220 of the hollow fiber membrane module 200 during the aeration cleaning process is dispersed into the first rib 124a and first protrusion(s) 124b, thereby improving the durability of the filtering apparatus.

The filtering apparatus may comprise a plurality of stoppers 300 each of which is fastened to at least two of the first ribs 124a passing through the through-holes TH of the receiver 224 for the convenience in installing the hollow fiber membrane modules 200 in the frame structure 100.

As shown in FIG. 2, each stopper 300 comprises a plurality of second ribs 310, and the second ribs 310 are inserted into the through-holes TH of the receivers 224 respectively together with the first ribs 124a of the lower cross bar 124.

The stopper 300 according to one embodiment of the present invention, as illustrated in FIG. 2, may further comprise a second protrusion(s) 320 between the second ribs 310. Owing to the second protrusion(s) 320, the power applied to the receiver 224 of the second header 220 of the hollow fiber membrane module 200 during the aeration cleaning process is dispersed into the first and second ribs 124a, 310 and the first and second protrusions 124b, 320, thereby improving the durability of the filtering apparatus.

According to another embodiment of the present invention, the filtering apparatus may comprise the same number of the stoppers 300 as that of the first ribs 124a of the lower cross bar 124, and each of the stoppers 300 may be fastened to only one first rib 124a.

The upper cross bar 125 of the frame structure 100 and the first header 210 of the hollow fiber membrane module 200 have the structures symmetrical to but identical with those of the lower cross bar 124 and second header 220 respectively, and are coupled together in the same way as them.

For example, as illustrated in FIG. 1 and FIG. 2, the upper cross bar 125 comprises the first ribs 125a and the first protrusions 125b therebetween, and the first header 210 of the hollow fiber membrane module 200 comprises a receiver 214 formed at the portion opposite to the first outlet port 213 and on the side opposite to the first fixing layer. When the hollow fiber membrane module 200 is installed in the frame structure 100, the first rib 125a of the upper cross bar 125 and the second rib 310 of the stopper 300 are inserted into the through-hole of the receiver 214.

According to the present invention, the relative vibration of the filtering membrane module 200 within the frame structure 100 which might occur during the aeration cleaning process can be minimized, and thus both the damage of the filtering membrane module 200 and the separation of the filtering membrane module 200 from the frame structure 100 both of which might be caused due to the relative vibration can be prevented.

The invention claimed is:

1. A filtering apparatus comprising:
a frame structure; and
a filtering membrane module installed in the frame structure,
wherein the frame structure comprises a cross bar,
the filtering membrane module comprises:
a header having a collecting space; and
a filtering membrane which is in fluid communication with the collecting space of the header,
the filtering membrane module is inserted in the frame structure in such a manner that a longitudinal direction of the header is perpendicular to a longitudinal direction of the cross bar,
the cross bar comprises a first rib protruding in parallel with the longitudinal direction of the header,
the header comprises a receiver having a through-hole into which the first rib is inserted,
the filtering apparatus further comprises a stopper fastened to an end of the first rib passing through the through-hole so as to prevent the filtering membrane module from being separated from the frame structure,
wherein a first hole is formed on the end of the first rib passing through the through-hole,
the stopper has a second hole corresponding to the first hole, and
the first rib and the stopper are fastened together with a bolt and a nut, the bolt passing through the first and second holes and screwing into the nut.

2. The filtering apparatus of claim 1, wherein the stopper comprises a second rib inserted into the through-hole of the receiver.

3. The filtering apparatus of claim 1, wherein the cross bar comprises a plurality of first ribs,
the filtering apparatus comprises a plurality of filtering membrane modules,
each of the filtering membrane modules comprises the receiver,
each of the first ribs is inserted into the through-hole of the each receiver respectively, and
the stopper is fastened to at least two of the first ribs.

4. The filtering apparatus of claim 3, wherein the stopper comprises a plurality of second ribs, and each of the second ribs is inserted into the through-hole of the each receiver respectively.

5. The filtering apparatus of claim 4, wherein the cross bar further comprises a first protrusion between the first ribs, and the stopper further comprises a second protrusion between the second ribs.

* * * * *